United States Patent
Sobanski et al.

(10) Patent No.: US 11,261,736 B1
(45) Date of Patent: Mar. 1, 2022

(54) VANE HAVING RIB ALIGNED WITH AERODYNAMIC LOAD VECTOR

(71) Applicant: Raytheon Technologies Corporation, Farmington, CT (US)

(72) Inventors: Jon E. Sobanski, Glastonbury, CT (US); Rutva A. Patel, Middletown, CT (US); Robert White, III, Meriden, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/034,200

(22) Filed: Sep. 28, 2020

(51) Int. Cl.
*F01D 5/18* (2006.01)
*F01D 5/14* (2006.01)

(52) U.S. Cl.
CPC .............. *F01D 5/147* (2013.01); *F01D 5/187* (2013.01); *F05D 2220/32* (2013.01); *F05D 2240/305* (2013.01)

(58) Field of Classification Search
CPC .............. F01D 5/187; F01D 5/18–189; F01D 5/14–148
See application file for complete search history.

(56) References Cited

U.S. PATENT DOCUMENTS

| | | | |
|---|---|---|---|
| 6,206,638 B1 | 3/2001 | Glynn et al. | |
| 7,569,172 B2* | 8/2009 | Pietraszkiewicz | B22C 7/06 264/313 |
| 7,909,580 B2* | 3/2011 | Simpson | F01D 5/16 416/223 A |
| 8,251,660 B1* | 8/2012 | Liang | F01D 5/187 416/96 R |
| 8,807,945 B2 | 8/2014 | Spangler et al. | |
| 9,810,084 B1* | 11/2017 | Spangler | F01D 5/186 |
| 10,072,516 B2* | 9/2018 | Carr | F01D 25/28 |
| 10,975,709 B1* | 4/2021 | Woodfield | F01D 9/065 |
| 11,092,022 B2* | 8/2021 | Sobanski | F01D 17/162 |
| 2002/0164250 A1* | 11/2002 | Chung | F01D 5/187 416/97 R |
| 2014/0234115 A1* | 8/2014 | Schibsbye | F03D 1/0675 416/226 |
| 2018/0045059 A1* | 2/2018 | Lee | F01D 5/187 |
| 2021/0102469 A1* | 4/2021 | Sobanski | F01D 5/282 |

* cited by examiner

*Primary Examiner* — Woody A Lee, Jr.
*Assistant Examiner* — Behnoush Haghighian
(74) *Attorney, Agent, or Firm* — Carlson, Gaskey & Olds, P.C.

(57) ABSTRACT

A vane for a gas turbine engine includes an airfoil section that has an airfoil wall defining a leading edge, a trailing edge, a pressure side, and a suction side that bound an internal cavity. The airfoil section has associated characteristics including a center of pressure and an aerodynamic load vector through the center of pressure. The airfoil wall has a single rib connecting the pressure side and the suction side. The single rib is aligned with the aerodynamic load vector.

14 Claims, 2 Drawing Sheets

VANE HAVING RIB ALIGNED WITH AERODYNAMIC LOAD VECTOR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

SUMMARY

A vane for a gas turbine engine according to an example of the present disclosure includes an airfoil section having an airfoil wall defining a leading edge, a trailing edge, a pressure side, and a suction side that bound an internal cavity. The airfoil section has associated characteristics including a center of pressure and an aerodynamic load vector through the center of pressure. The airfoil wall has a single rib connecting the pressure side and the suction side. The single rib is aligned with the aerodynamic load vector.

In a further embodiment of any of the foregoing embodiments, the single rib is straight.

In a further embodiment of any of the foregoing embodiments, the single rib forms locally non-perpendicular angles with the suction side and the pressure side.

In a further embodiment of any of the foregoing embodiments, the airfoil section defines an axial span from the leading edge to the trailing edge, and the single rib connects to the pressure side at 25% to 40% of the axial span and the single rib connects to the suction side at 60% to 75% of the axial span.

In a further embodiment of any of the foregoing embodiments, the single rib connects to the suction side at a suction side maximum bulge deflection location and connects to the pressure side at a pressure side maximum bulge deflection location.

In a further embodiment of any of the foregoing embodiments, the airfoil section has as associated aerodynamic turning path, and the aerodynamic load vector is orthogonal to a tangent of the aerodynamic turning path.

In a further embodiment of any of the foregoing embodiments, the airfoil section is formed of ceramic.

In a further embodiment of any of the foregoing embodiments, the single rib is double-walled.

A gas turbine engine according to an example of the present disclosure includes a compressor section, a combustor in fluid communication with the compressor section and a turbine section in fluid communication with the combustor. The turbine section has vanes disposed about a central axis of the gas turbine engine. Each of the vanes has an airfoil section that has an airfoil wall defining a leading edge, a trailing edge, a pressure side, and a suction side that bound an internal cavity. The airfoil section has associated characteristics including a center of pressure and an aerodynamic load vector through the center of pressure. The airfoil wall has a single rib connecting the pressure side and the suction side. The single rib is aligned with the aerodynamic load vector.

In a further embodiment of any of the foregoing embodiments, the single rib lies in a plane that form an angle of 40° to 60° with the central axis of the engine.

In a further embodiment of any of the foregoing embodiments, the single rib is straight.

In a further embodiment of any of the foregoing embodiments, the single rib and the aerodynamic load vector lie in a common plane.

In a further embodiment of any of the foregoing embodiments, the single rib forms locally non-perpendicular angles with the suction side and the pressure side.

In a further embodiment of any of the foregoing embodiments, the airfoil section defines an axial span from the leading edge to the trailing edge, and the single rib connects to the pressure side at 25% to 40% of the axial span and the single rib connects to the suction side at 60% to 75% of the axial span.

In a further embodiment of any of the foregoing embodiments, the single rib connects to the suction side at a suction side maximum bulge deflection location and connects to the pressure side at a pressure side maximum bulge deflection location.

In a further embodiment of any of the foregoing embodiments, the airfoil section has as associated aerodynamic turning path, and the aerodynamic load vector is orthogonal to a tangent of the aerodynamic turning path.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
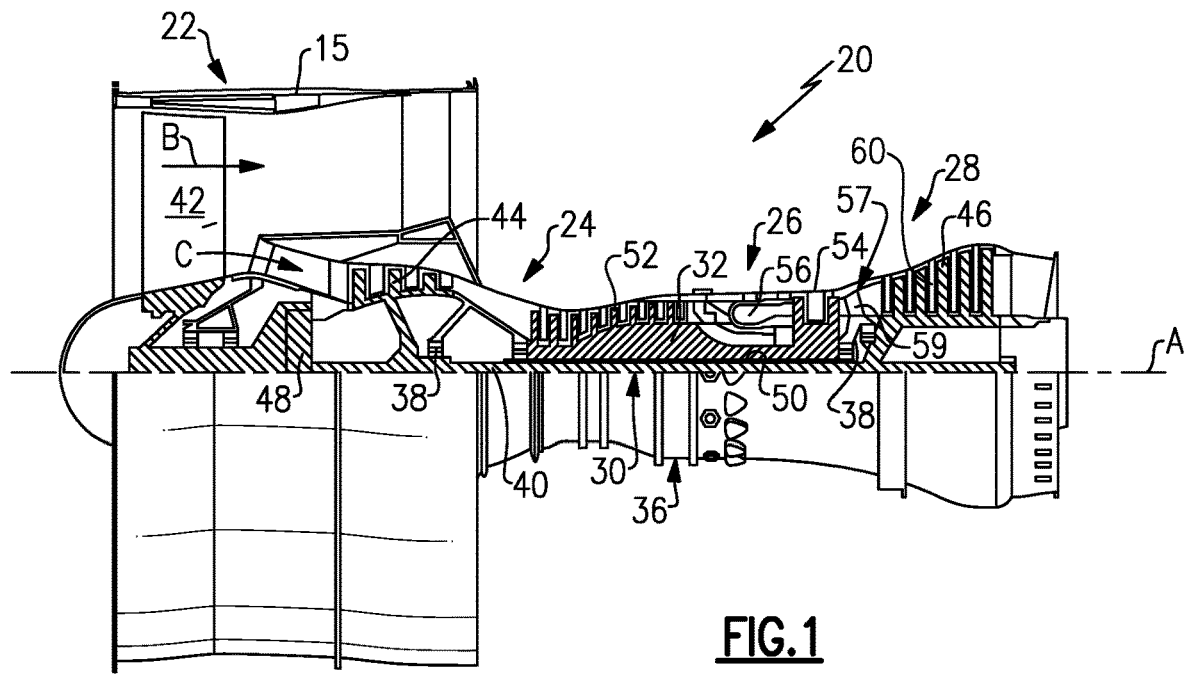
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°\,R)/(518.7°\,R)]^{0.5}$. The "Low corrected fan tip speed" as disclosed herein according to one non-limiting embodiment is less than about 1150 ft/second (350.5 meters/second).

Figure 2:
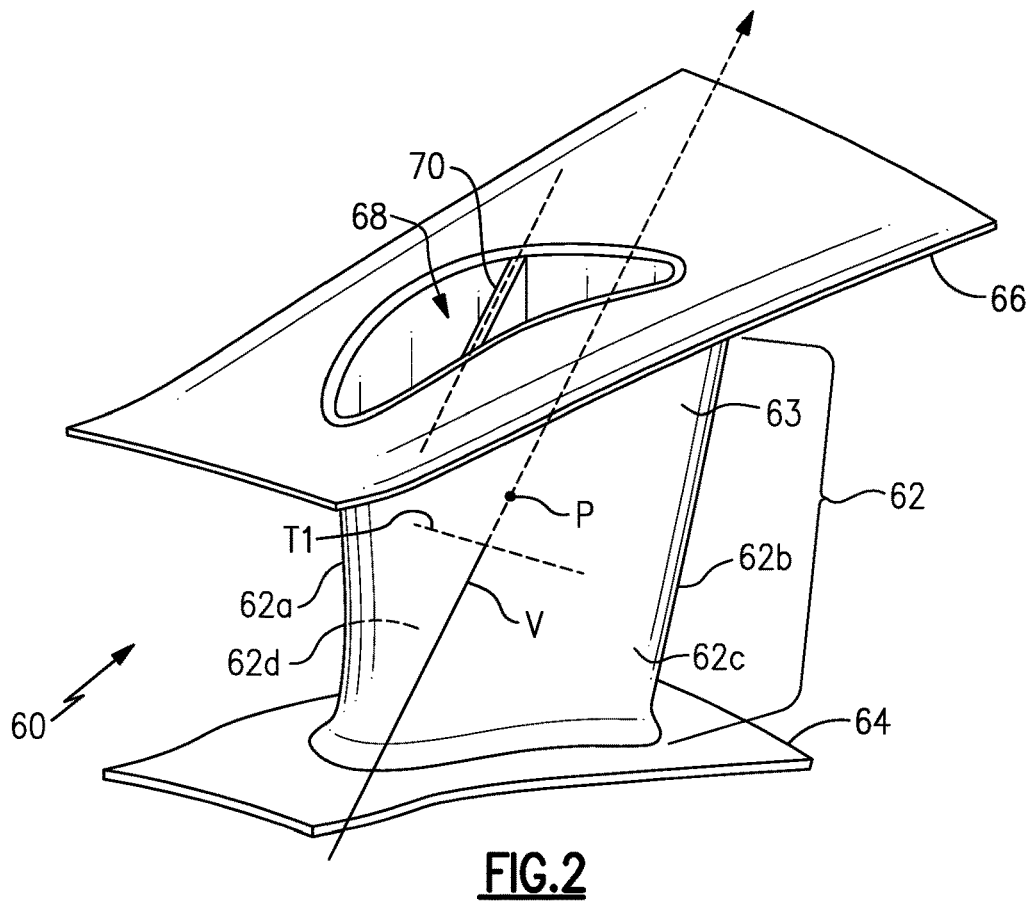
FIG. 2 illustrates a vane from the turbine section of the engine.

FIG. 2 illustrates a representative example of a vane 60 from a row of vanes in the turbine section 28 of the engine 20 (see also FIG. 1). The vane 60 includes an airfoil section 62 that is formed by an airfoil wall 63. The airfoil wall 63 defines a leading edge 62a, a trailing edge 62b, and first and second sides 62c/62d that join the leading edge 62a and the trailing edge 62b. In this example, the first side 62c is a pressure side and the second side 62d is a suction side. The airfoil section 62 generally extends in a radial direction relative to the central engine axis and spans from a first end at an inner platform 64 to a second end at an outer platform 66. The terms "inner" and "outer" refer to location with respect to the central engine axis A, i.e., radially inner or radially outer.

The airfoil section 62 may be formed of a metallic alloy or a ceramic material. Example alloys include, but are not limited to, nickel- and cobalt-based superalloys. If ceramic, the ceramic is a monolithic ceramic, a ceramic matrix composite ("CMC"), or a combination thereof. CMCs are comprised of a ceramic reinforcement, which is usually ceramic fibers, in a ceramic matrix. A monolithic ceramic does not contain reinforcement and may be a solid poly- or mono-crystalline ceramic. Example monolithic ceramics are, but are not limited to, silicon-containing monolithic ceramics. Example silicon-containing monolithic ceramics are, but are not limited to, silicon carbide (SiC) monolithic ceramic or silicon nitride ($Si_3N_4$) monolithic ceramic. Example ceramic matrices of the CMC are silicon-containing ceramics, such as but not limited to, a silicon carbide (SiC) matrix or silicon nitride ($Si_3N_4$) matrix. Example ceramic reinforcement of the CMC are silicon-containing ceramic fibers, such as but not limited to, silicon carbide (SiC) fibers or silicon nitride ($Si_3N_4$) fibers.

The airfoil section 62 circumscribes an interior cavity 68. The cavity 68 is bound by the leading edge 62a, trailing edge 62b, first side 62c, and second side 62d. The airfoil wall 63 also includes a single rib 70 that divides the cavity 68 into a forward sub-cavity and an aft sub-cavity. As there is only one rib 70, the vane 60 includes only the two sub-cavities. These sub-cavities are core cavities, as opposed to "mini-core" type cavities that are sometimes embedded in airfoil walls.

In general, cooling air, such as bleed air from the compressor section 24, is supplied to one or both of the sub-cavities. Additionally, one or both sub-cavities may serve as a through-cavity for receiving a spar that supports the vane 60 and/or a baffle for distributing the cooling air.

The cooling air provided to vanes in general is pressurized and thus exerts an internal pressure on the airfoil wall that tends to cause the vane to bulge (deflect) outwards. While some bulging may be acceptable, vanes must also bear/transmit aerodynamic loads, accommodate spars/baffles, have adequate cooling, and have a geometry that is feasible to manufacture. Given such constraints, to achieve a good balance among the factors above, vanes may have multiple ribs that span at locally perpendicular angles from the pressure and suction side walls. It has been found in the disclosed vane 60, however, that the single rib 70 can provide an acceptable vane stiffness if it is oriented in a particular manner. The use of the single rib 70, in turn, enables relatively larger sub-cavities in comparison to having two or more ribs, which can thus more easily accommodate spars and baffles.

In this regard, the airfoil section 62 has associated characteristics that include a center of pressure P and an aerodynamic load vector V (hereafter "vector V") through the center of pressure. As will be discussed below, the single rib 70 is oriented with respect to the vector V.

The vector V is defined by the aerodynamics of the engine 20, including the vane count, mass flow rate, and the turning of the hot gas stream by the vane 60. The turning is a function of the vane 60 inlet flow angle and the stage reaction, and is independent of the vane camber and/or the chord, for example. The direction of the vector V is defined herein as being orthogonal to the tangent (represented at T1) of the aerodynamic turning path of the vane 60, and is located at the center of pressure P of the airfoil section 63. Those of ordinary skill in the art will know where this location is and how to determine the vector V, as they will need to determine it at some point during the design process.

Figure 3:
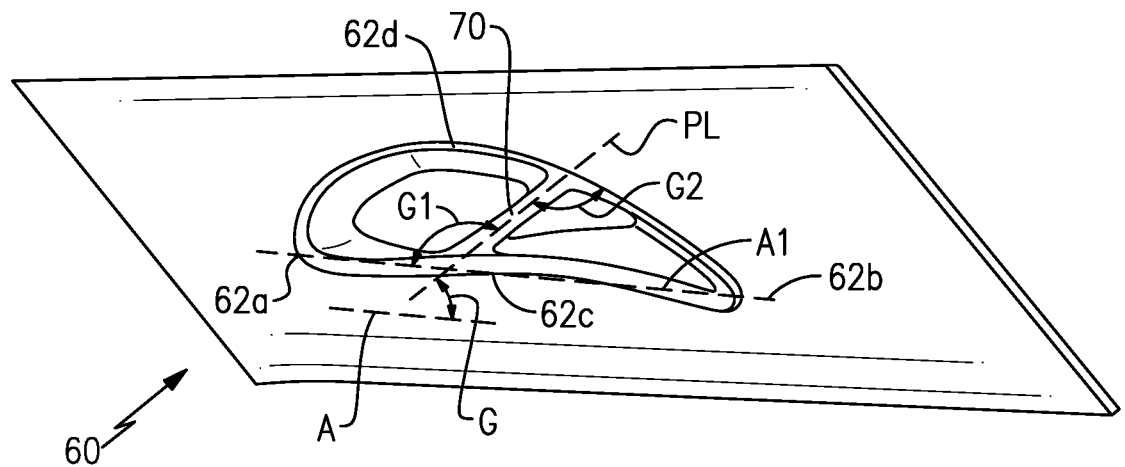
FIG. 3 illustrates a radial view of the vane.

As generally depicted in FIG. 2, the single rib 70 is aligned with the vector V, within an angle of +/−15° relative to the chord of the vane 60. For example, as can be seen in the radial view of the vane 60 in FIG. 3, the single rib 7 is straight in that it resides in a flat plane PL. In this example, the plane PL is non-intersecting with the vector V. For instance, the plane PL forms an angle G (FIG. 3) of 40° to 60° with the engine axis A. In further example, the rib 70 is curved. For instance, the pressure field along the span of the airfoil section 62 is not linear. Rather, at different spans the center of pressure is at a different chord length. Therefore, in such an example, the rib 70 is aligned over the full span of the airfoil section relative to the center of pressure at each span position of the rib 70. In that case, the rib 70 is curved in accordance with the non-linear center of pressure along the span. In one further example, at each span position the entire rib 70 is aligned as above relative to the vector V at the center of pressure at that span position.

Figure 4A:
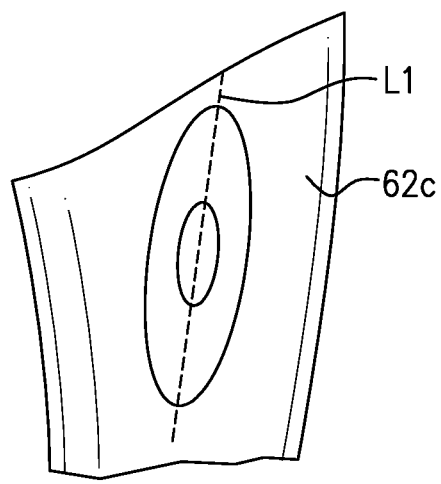
FIG. 4A illustrates bulge deflection of a pressure side of a vane.
Figure 4B:
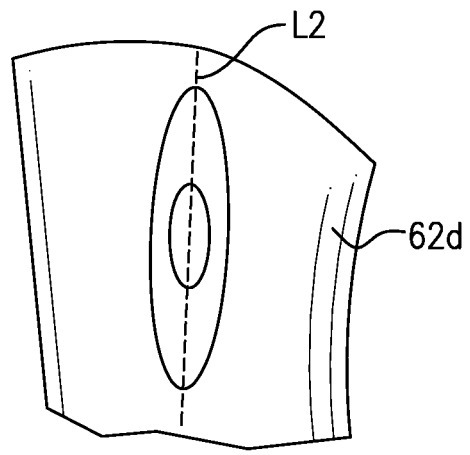
FIG. 4B illustrates bulge deflection of a suction side of a vane.

The single rib 70 also connects to the pressure side 62c and the suction side 62d at maximum bulge deflection locations, which are shown at L1 and L2 in FIGS. 4A and 4B, respectively. The locations L1 and L2 correspond to the axial positions at which there is maximum bulge deflection without the rib 70. Such locations can be determined experimentally or from computer simulation, taken at cruise conditions, for example. It should be noted, however, that the vector V does not appreciably change in the turbine section with changing flight conditions for a fixed area turbines (i.e., non-variable area vanes).

In further examples, the locations L1 and L2 can be represented as axial positions in the axial span, Al (FIG. 2), from the leading edge 62a to the trailing edge 62b. Positions in the axial span are indicated as a percentage of the axial span, from 0% axial span at the leading edge 62a of the airfoil section 62 to 100% axial span at the trailing edge 62b. In one example, the location L1 is at a position from 20% of the axial span to 40% of the axial span. The rib 70 thus lies in a region from 55% of the axial span to 75% of the axial span. As the locations L1 and L2 are different, the rib 70 forms locally non-perpendicular angles G1/G2 with the pressure side 62c and suction side 62d. For instance, the locations L1 and L2 differ (L1-L2) by at least 20% and usually not more than 40%. In one example, the rib 70 connects to the pressure side 62c at 25% to 40% of the axial span and the rib 70 connects to the suction side 62d at 60% to 75% of the axial span.

The alignment of the rib 70 with the vector V enhances vane stiffness, which in turn facilitates reduction in bulge deflection. Moreover, since the rib 70 is located at the maximum bulge deflection locations, there is adequate stiffness that eliminates the need for additional ribs. If the vane 60 is formed of CMC, there may also be processing enhancements. For instance, a CMC vane can be formed by wrapping a fiber structure around mandrels and then infiltrating the fiber structure with the ceramic matrix. Each sub-cavity is formed by a corresponding mandrel. Thus, for a given vane size, higher numbers of sub-cavities require higher numbers of mandrels, which are also smaller. Since there are only two sub-cavities with the single rib 70, only two mandrels are needed to form the vane 60 and the mandrels can be relatively larger and more robust.

Figure 5:
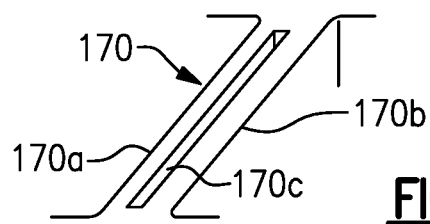
FIG. 5 illustrates an example of a rib of a vane.

FIG. 5 illustrates another example rib 170 that can be used in the vane 60. In this disclosure, like reference numerals designate like elements where appropriate and reference numerals with the addition of one-hundred or multiples thereof designate modified elements that are understood to incorporate the same features and benefits of the corresponding elements. In this example, the rib 170 is double-walled and includes a forward wall 170a and an aft wall 170b. There is a narrow cavity 170c defined between the walls 170a/170b. For instance, the narrow cavity 170c is has a thickness that is equal or less than each of the thicknesses of the walls 170a/170b. For example, the cavity 170c does not receive cooling air flow-through but rather serves as an adjustment factor to "tune" the thermal characteristics of the rib 170. In this regard, the thickness of the cavity 170c is selected with respect to a desired thermal characteristic target, such as a thermal conductance target.

The cavity 170c may be formed by a lost core fabrication technique. For example, a carbon body is used in the ceramic lay-up. Upon densification of the ceramic the carbon burns off, leaving the cavity 170c.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane for a gas turbine engine, comprising:
   an airfoil section having an airfoil wall defining a leading edge, a trailing edge, a pressure side, and a suction side that bound an internal cavity, the airfoil section having associated characteristics including a center of pressure and an aerodynamic load vector through the center of pressure, the airfoil wall having a single rib connecting the pressure side and the suction side, the single rib being aligned with the aerodynamic load vector.

2. The vane as recited in claim 1, wherein the single rib is straight.

3. The vane as recited in claim 1, wherein the single rib forms locally non-perpendicular angles with the suction side and the pressure side.

4. The vane as recited in claim 1, wherein the airfoil section defines an axial span from the leading edge to the trailing edge, and the single rib connects to the pressure side at 25% to 40% of the axial span and the single rib connects to the suction side at 60% to 75% of the axial span.

5. The vane as recited in claim 1, wherein the single rib connects to the suction side at a suction side maximum bulge deflection location and connects to the pressure side at a pressure side maximum bulge deflection location.

6. The vane as recited in claim 1, wherein the airfoil section is formed of ceramic.

7. The vane as recited in claim 1, wherein the single rib is double-walled.

8. A gas turbine engine comprising:
a compressor section;
a combustor in fluid communication with the compressor section; and
a turbine section in fluid communication with the combustor, the turbine section having vanes disposed about a central axis of the gas turbine engine, each of the vanes includes:
an airfoil section having an airfoil wall defining a leading edge, a trailing edge, a pressure side, and a suction side that bound an internal cavity, the airfoil section having associated characteristics including a center of pressure and an aerodynamic load vector through the center of pressure, the airfoil wall having a single rib connecting the pressure side and the suction side, the single rib being aligned with the aerodynamic load vector.

9. The engine as recited in claim 8, wherein the single rib lies in a plane that form an angle of 40° to 60° with the central axis of the engine.

10. The engine as recited in claim 8, wherein the single rib is straight.

11. The engine as recited in claim 10, wherein the single rib and the aerodynamic load vector lie in a common plane.

12. The engine as recited in claim 11, wherein the single rib forms locally non-perpendicular angles with the suction side and the pressure side.

13. The engine as recited in claim 12, wherein the airfoil section defines an axial span from the leading edge to the trailing edge, and the single rib connects to the pressure side at 25% to 40% of the axial span and the single rib connects to the suction side at 60% to 75% of the axial span.

14. The engine as recited in claim 13, wherein the single rib connects to the suction side at a suction side maximum bulge deflection location and connects to the pressure side at a pressure side maximum bulge deflection location.

* * * * *